(12) United States Patent
Byrd et al.

(10) Patent No.: US 10,704,294 B1
(45) Date of Patent: Jul. 7, 2020

(54) WIRELESSLY ACTUATED COVER FOR A STRUCTURE

(71) Applicant: Lockheed Martin Corporation, Bethesda, MD (US)

(72) Inventors: Thomas E. Byrd, Grand Prairie, TX (US); Thomas Hiromoto, Dallas, TX (US)

(73) Assignee: Lockheed Martin Corporation, Bethesda, MD (US)

(*) Notice: Subject to any disclaimer, the term of this patent is extended or adjusted under 35 U.S.C. 154(b) by 334 days.

(21) Appl. No.: 15/489,222

(22) Filed: Apr. 17, 2017

(51) Int. Cl.
| | |
|---|---|
| *E06B 3/00* | (2006.01) |
| *E05B 47/00* | (2006.01) |
| *E06B 5/00* | (2006.01) |
| *E05B 65/00* | (2006.01) |
| *E05C 19/00* | (2006.01) |
| *B64C 1/14* | (2006.01) |

(52) U.S. Cl.
CPC ............ *E05B 47/0001* (2013.01); *B64C 1/14* (2013.01); *E05B 47/0011* (2013.01); *E05B 65/001* (2013.01); *E05C 19/001* (2013.01); *E06B 5/00* (2013.01); *E05B 2047/0073* (2013.01); *E05B 2047/0094* (2013.01)

(58) Field of Classification Search
CPC ............. E05B 49/0001; E05B 65/001; E05B 47/0011; E05B 2047/0073; E05B 2047/0094; B64C 1/14; E06B 5/00; E05C 19/001; G07C 9/00
USPC .......................................................... 49/501
See application file for complete search history.

(56) References Cited

U.S. PATENT DOCUMENTS

| | | | |
|---|---|---|---|
| 7,766,274 B1* | 8/2010 | Jameson | B64C 39/024 244/137.1 |
| 8,633,799 B1* | 1/2014 | Aronson | E05B 45/005 340/5.64 |
| 8,922,333 B1* | 12/2014 | Kirkjan | G07C 9/00309 235/376 |
| 9,384,607 B1* | 7/2016 | Copeland | G07C 9/00111 |
| 10,145,144 B1* | 12/2018 | Shyu | E05B 3/00 |
| 10,422,166 B2* | 9/2019 | Papanikolaou | E05B 81/76 |
| 2009/0085717 A1* | 4/2009 | Kirkjan | G07C 9/00309 340/5.2 |
| 2009/0243355 A1* | 10/2009 | Heeg | B60N 2/42763 297/216.12 |
| 2009/0256676 A1* | 10/2009 | Piccirillo | E05B 41/00 340/5.65 |

(Continued)

*Primary Examiner* — Jerry E Redman
(74) *Attorney, Agent, or Firm* — Withrow & Terranova, PLLC

(57) ABSTRACT

A cover is configured to selectively engage with a portion of a structure in response to receiving a wireless electrical power signal at a receiver antenna of the cover from a wireless power source located in an outside environment, to separate a first environment on a first side of the cover from a second environment on a second side of the cover opposite the first side. In response to wirelessly receiving the electrical power signal, a fastening subassembly of the cover changes from a secured mode configured to inhibit opening a cover body with respect to the structure, to an unsecured mode configured to facilitate opening the cover body with respect to the structure. This in turn allows the cover to be matingly engaged with a portion of the structure to form a smooth continuous surface, without any exposed fasteners on the exterior side of the cover.

15 Claims, 12 Drawing Sheets

(56) References Cited

U.S. PATENT DOCUMENTS

| | | | |
|---|---|---|---|
| 2009/0272758 A1* | 11/2009 | Karwacki, Jr. | B65B 1/16 221/278 |
| 2010/0031713 A1* | 2/2010 | Brown | E05B 47/00 70/91 |
| 2010/0307206 A1* | 12/2010 | Taylor | G07C 9/00309 70/91 |
| 2011/0090045 A1* | 4/2011 | Smith | E05B 43/005 340/5.28 |
| 2011/0252845 A1* | 10/2011 | Webb | H02N 2/183 70/101 |
| 2013/0016146 A1* | 1/2013 | Hashiguchi | B41J 2/04573 347/10 |
| 2014/0305046 A1* | 10/2014 | Stearns | E04D 3/36 52/58 |
| 2015/0107316 A1* | 4/2015 | Kirkjan | G07C 9/00309 70/275 |
| 2015/0237424 A1* | 8/2015 | Wilker | H04R 1/026 381/150 |
| 2016/0017640 A1* | 1/2016 | Soloway | G07C 9/00309 70/91 |
| 2016/0042210 A1* | 2/2016 | Hiraiwa | G06K 7/10356 235/439 |
| 2016/0042211 A1* | 2/2016 | Hiraiwa | G06K 7/10356 235/439 |
| 2016/0042212 A1* | 2/2016 | Hiraiwa | G06K 7/10356 235/439 |
| 2016/0069039 A1* | 3/2016 | Johnson | G01D 4/008 340/870.02 |
| 2016/0203687 A1* | 7/2016 | Lee | G08B 25/10 340/545.2 |
| 2016/0276120 A1* | 9/2016 | Arcas | H01H 47/043 |
| 2017/0186256 A1* | 6/2017 | Dumas | G07C 9/00182 |
| 2017/0352208 A1* | 12/2017 | Calvert | E05B 65/0075 |
| 2018/0019518 A1* | 1/2018 | Man | G08B 1/08 |
| 2018/0058103 A1* | 3/2018 | Heisler | E05B 47/0012 |
| 2018/0072054 A1* | 3/2018 | Sato | B41J 2/04573 |
| 2018/0093830 A1* | 4/2018 | Uno | G06Q 10/087 |
| 2018/0114181 A1* | 4/2018 | Uno | B65G 1/137 |
| 2018/0201012 A1* | 7/2018 | Miyagishi | B41J 2/04508 |
| 2019/0128043 A1* | 5/2019 | Ren | B60K 15/05 |
| 2019/0208675 A1* | 7/2019 | Sabatier | H01Q 1/526 |
| 2019/0212777 A1* | 7/2019 | Kemppinen | G06F 1/1637 |
| 2019/0213366 A1* | 7/2019 | Gould | G06K 7/10366 |
| 2019/0263120 A1* | 8/2019 | Tomimatsu | B41J 2/14233 |
| 2019/0277057 A1* | 9/2019 | Brown | E05B 17/2084 |

* cited by examiner

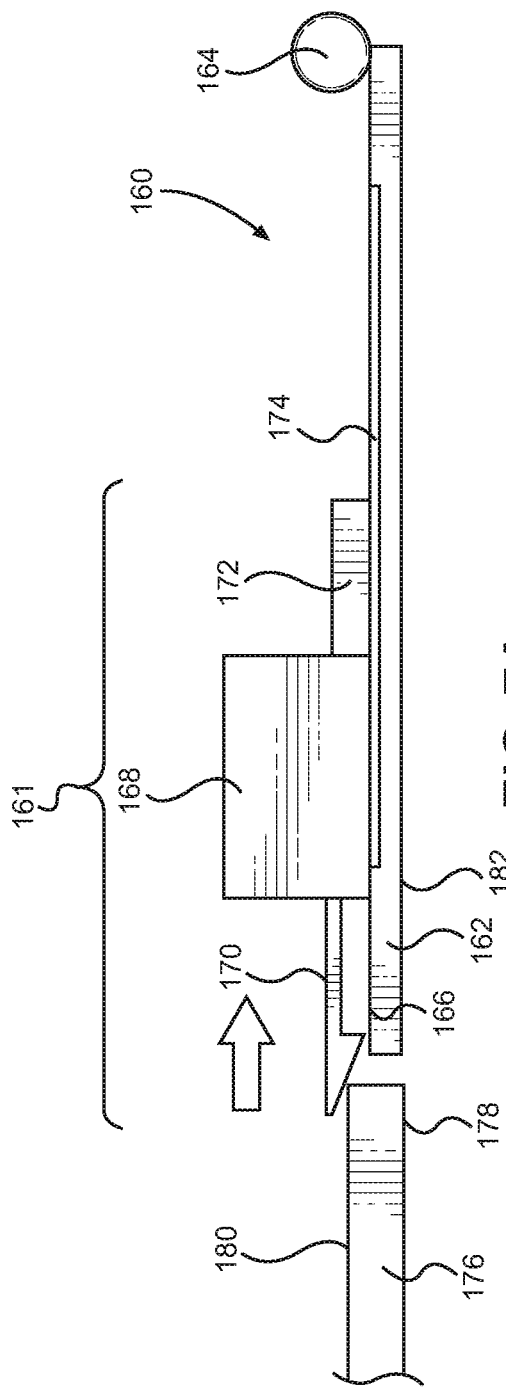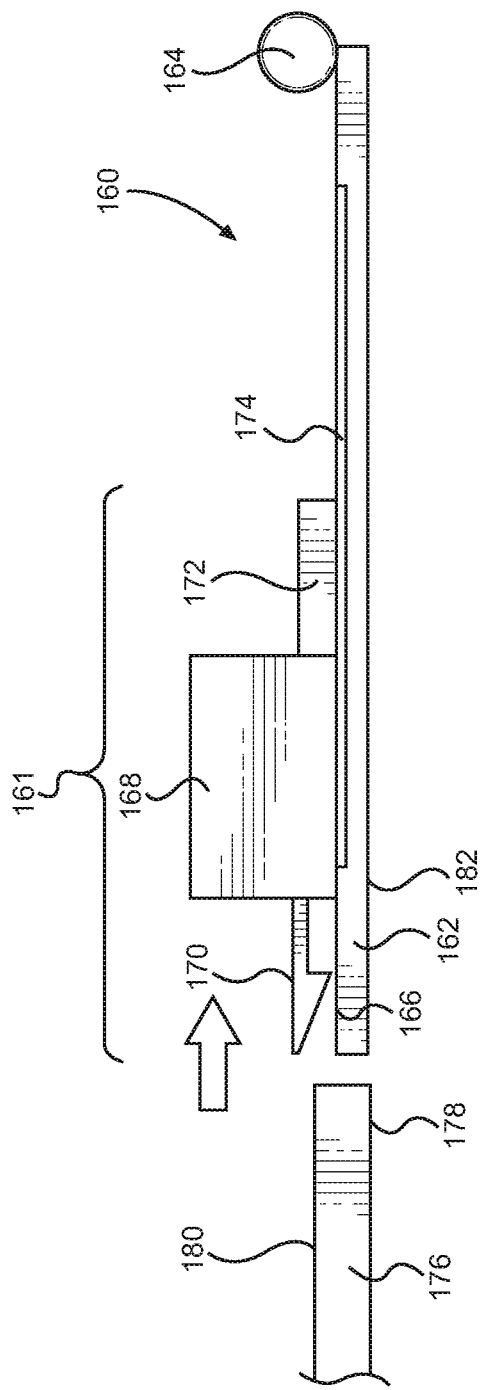

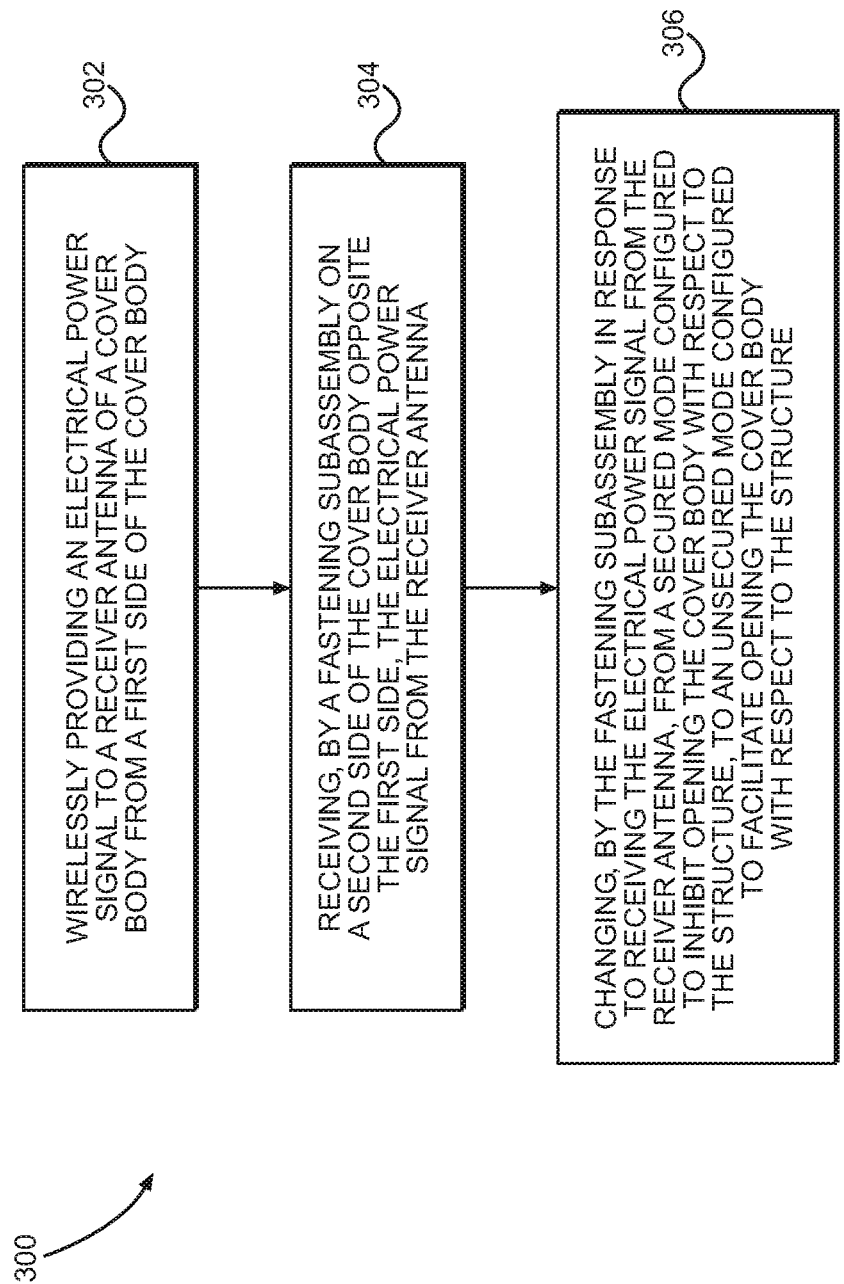

WIRELESSLY ACTUATED COVER FOR A STRUCTURE

TECHNICAL FIELD

Embodiments relate to a cover for a structure, and more particularly to a wirelessly actuated cover for a structure.

BACKGROUND

Conventional covers have many different applications. In some applications, such as a cover for an access opening in an aircraft housing for example, it may be desirable to provide an exterior surface that is as smooth and continuous as possible, to improve aerodynamic and stealth capabilities of the aircraft housing, for example. However, one drawback of conventional covers is that a number of exposed conventional fasteners may be required to secure the cover to the housing. This leads to a less smooth and less continuous surface, which may in turn adversely impact the aerodynamic and stealth capabilities of the aircraft housing, for example. Thus, there is a need for a cover that does not have these drawbacks.

SUMMARY

Embodiments relate to a cover for a structure and, more particularly, to a wirelessly actuated cover for a structure. In one embodiment, a cover includes a cover body configured to selectively engage with a portion of a structure to separate a first environment on a first side of the cover from a second environment on a second side of the cover opposite the first side. The cover is configured to be selectively secured and/or unsecured with the structure in response to receiving a wireless electrical power signal at a receiver antenna of the cover, from a wireless power source located in an outside environment. In response to wirelessly receiving the electrical power signal, a fastening subassembly of the cover changes from a secured mode configured to inhibit opening the cover body with respect to the structure, to an unsecured mode configured to facilitate opening the cover body with respect to the structure. This in turn allows the cover to be matingly engaged with a portion of the structure to form a barrier between the first environment and the second environment, without any exposed fasteners on the exterior side of the cover, while maintaining the ability for a user to selectively open the cover from the exterior first side of the cover.

According to one embodiment, a cover for selectively covering a portion of a structure is disclosed. The cover includes a cover body having a first side and a second side opposite the first side. The cover body is configured to matingly engage with a structure to separate a first environment on the first side of the cover body from a second environment on the second side of the cover body. The cover further includes a receiver antenna coupled to the cover body. The receiver antenna is configured to wirelessly receive an electrical power signal from a wireless power source located in the first environment. The cover further includes a fastening subassembly coupled to the second side of the cover body, the fastening subassembly having a secured mode configured to inhibit opening the cover body with respect to the structure, and an unsecured mode configured to facilitate opening the cover body with respect to the structure. The fastening subassembly is configured to receive the electrical power signal from the receiver antenna. The fastening subassembly is further configured to change from the secured mode to the unsecured mode in response to receiving the electrical power signal from the receiver antenna.

According to another embodiment, a tool for selectively securing a cover with respect to a structure is disclosed. The tool includes a tool body having a first side configured to matingly engage with a cover. The tool further includes a power distribution component configured to provide an electrical power signal. The tool further includes a transmitter antenna coupled to the tool body proximate the first side, the transmitter antenna being configured to receive the electrical power signal from the power distribution component and wirelessly transmit the electrical power signal to a complementary receiver antenna disposed in the cover to change the cover from a secured mode with respect to the structure to an unsecured mode with respect to the structure.

According to another embodiment, a method of selectively covering a portion of a structure is disclosed. The method includes wirelessly providing an electrical power signal to a receiver antenna of a cover body from a first side of the cover body. The method further includes receiving, by a fastening subassembly on a second side of the cover body opposite the first side, the electrical power signal from the receiver antenna. The method further includes changing, by the fastening subassembly in response to receiving the electrical power signal from the receiver antenna, from a secured mode configured to inhibit opening the cover body with respect to the structure, to an unsecured mode configured to facilitate opening the cover body with respect to the structure.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 7A and 7B illustrate cutaway side views of the hinged cover of FIG. 6 in the secured mode, with the electromechanical actuator inhibiting opening of the cover from the structure opening, and in the unsecured mode, with the electromechanical actuator facilitating opening of the cover from the structure opening, respectively;

FIG. 9 illustrates a flowchart diagram of a method of wirelessly actuating a cover to change the cover from a secured mode to an unsecured mode, according to an embodiment.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first fastener" and "second fastener," and does not imply a priority, a type, an importance, or other attribute, unless otherwise stated herein. The term "substantially" used herein in conjunction with a numeric value means any value that is within a range of five percent greater than or five percent less than the numeric value.

As used herein and in the claims, the articles "a" and "an" in reference to an element refers to "one or more" of the element unless otherwise explicitly specified.

Embodiments relate to a cover for a structure and, more particularly, to a wirelessly actuated cover for a structure. In one embodiment, a cover includes a cover body configured to selectively engage with a portion of a structure to separate a first environment on a first side of the cover from a second environment on a second side of the cover opposite the first side. The cover is configured to be selectively secured and/or unsecured with the structure in response to receiving a wireless electrical power signal at a receiver antenna of the cover, from a wireless power source located in an outside environment. In response to wirelessly receiving the electrical power signal, a fastening subassembly of the cover changes from a secured mode configured to inhibit opening the cover body with respect to the structure, to an unsecured mode configured to facilitate opening the cover body with respect to the structure. This in turn allows the cover to be matingly engaged with a portion of the structure to form a barrier between the first environment and the second environment, without any exposed fasteners on the exterior side of the cover, while maintaining the ability for a user to selectively open the cover from the exterior first side of the cover.

Figure 1:
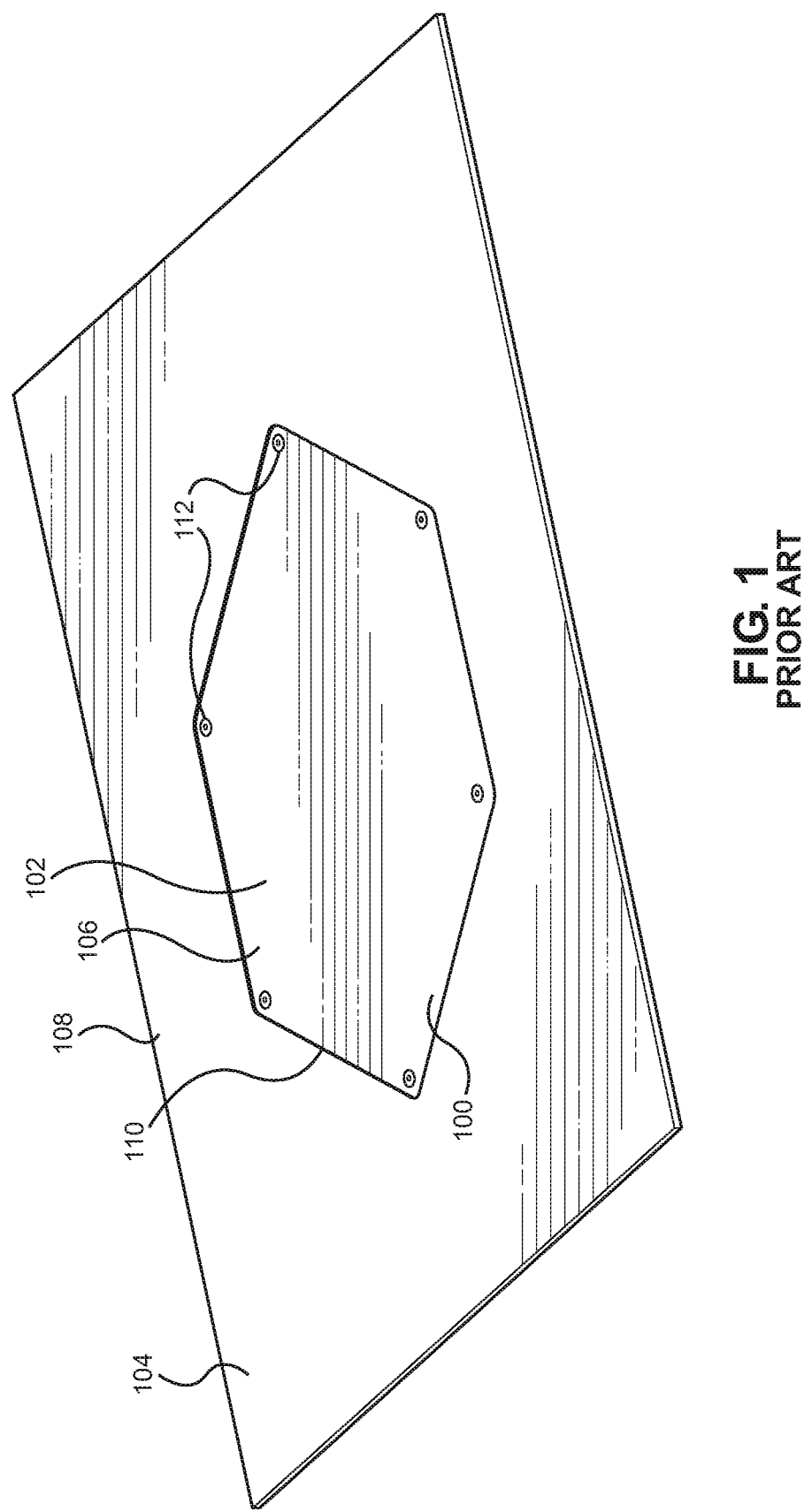
FIG. 1 illustrates a conventional cover secured to a structure with exposed bolt fasteners according to the prior art.

Before discussing the embodiments, a conventional cover 100 according to the prior art will be described with respect to FIG. 1. The conventional cover 100 includes a cover body 102 configured to engage a structure 104, such as, for example, an aircraft housing. The conventional cover 100 has a cover exterior side 106 configured to form a continuous surface with a structure exterior side 108 of the structure 104. In many applications, such as a carbon fiber aircraft housing, it is desirable to provide an exterior surface that is as smooth and continuous as possible, to improve aerodynamic and stealth capabilities of the aircraft housing, for example. Thus, it is desirable for the cover exterior side 106 and the structure exterior side 108 to be formed within precise tolerances in order to minimize a seam 110 therebetween. However, a number of conventional fasteners 112 are required to secure the cover body 102 of the conventional cover 100 to the structure 104. While these conventional fasteners 112, such as bolts for example, may be recessed, the conventional fasteners 112 are nevertheless exposed with respect to the cover exterior side 106 and the structure exterior side 108, and may still adversely impact the aerodynamic and stealth capabilities of the aircraft housing, for example. This in turn may require secondary processing, such as adding a protective coating over the entire cover exterior side 106, structure exterior side 108 and exposed conventional fasteners 112, to provide a sufficiently smooth continuous surface. This approach may also have the additional drawback of making removal and replacement of the conventional cover 100 more difficult, time-consuming, and expensive, because accessing the conventional fasteners 112 and removing the conventional cover 100 may require first removing a portion of the protective coating, and reapplying the protective coating after re-securing the conventional cover 100 to the structure 104. Repeated removal and replacement of the conventional fasteners 112 may also damage portions of the conventional cover 100 or structure 104, which may be formed from easily damaged materials. Thus, there is a need for a cover for a structure that does not exhibit these drawbacks.

Figure 2:
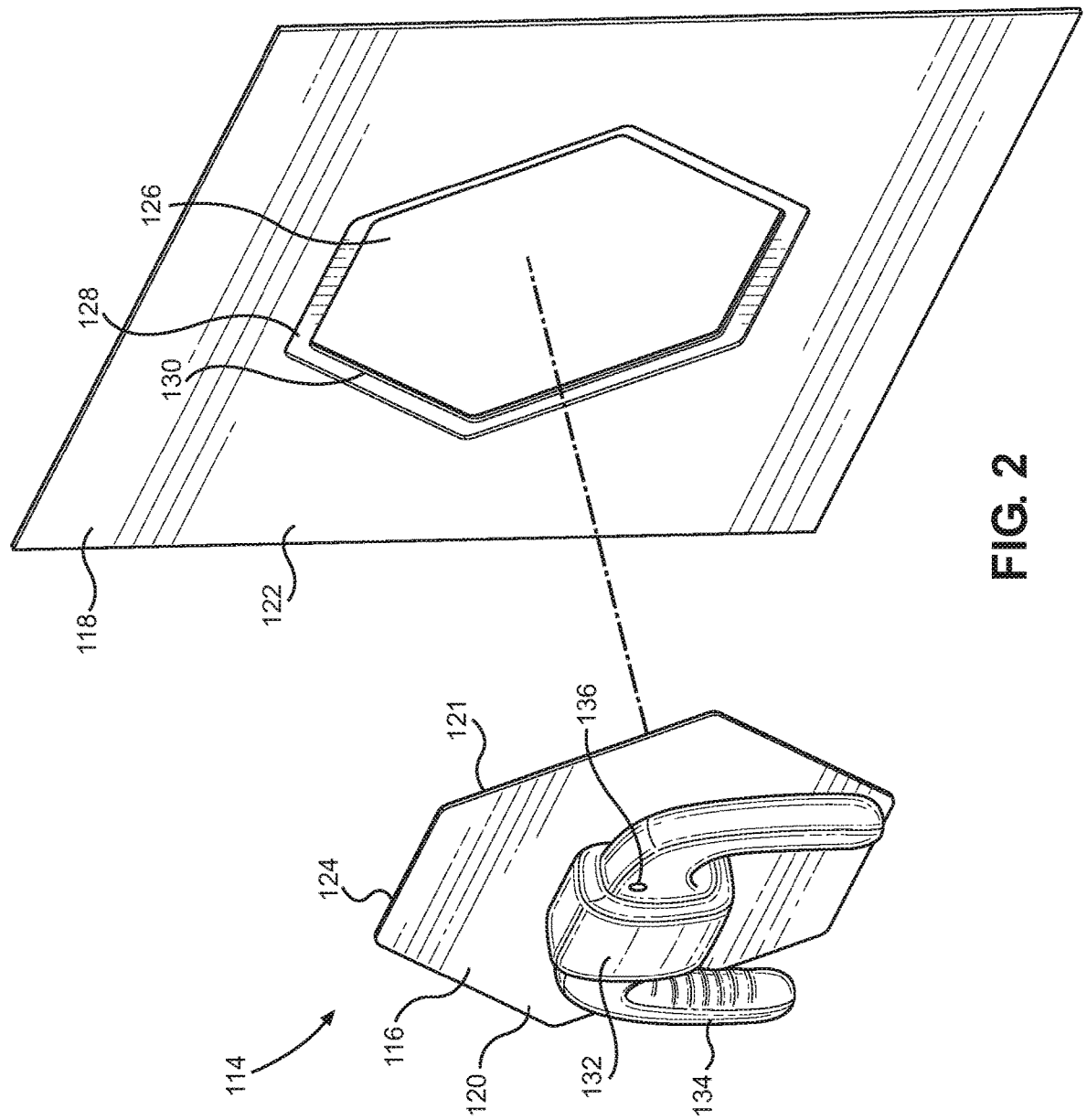
FIG. 2 illustrates a cover configured to be wirelessly actuated to change the cover between a secured mode and an unsecured mode.

In this regard, FIG. 2 illustrates a wirelessly actuated cover 114 having a cover body 116 for selectively engaging with a portion of a structure 118 according to an embodiment. In this embodiment, the cover 114 is an access panel and the structure 118 is part of an aircraft housing, but it should be understood that these and other embodiments may be used in any number of different applications. The cover body 116 of the cover 114 has a first side 120, e.g., an exterior side, and a second side 121, e.g., an interior side, opposite the first side 120. The cover body 116 in this embodiment is configured to matingly engage with an exterior side 122 of the structure 118 to separate an environment on the first side 120 of the cover body 116 from an environment on the second side 121 of the cover body 116. The cover body 116 in this example is configured to matingly engage with an aperture 126 in the structure 118. In particular, a perimeter edge 124 of the cover body 116 engages with a recessed rim 128 extending around the aperture 126 of the structure 118, with the perimeter edge 124 of the cover body 116 matingly engaging with an interior perimeter edge 130 extending around the aperture 126.

As will be discussed in greater detail with respect to FIGS. 3A and 3B below, the cover 114 is configured to be selectively secured over the aperture 126 of the structure 118 without requiring any exposed fasteners on the first side 120 of the cover body 116 or the exterior side 122 of the structure 118. Instead, FIG. 2 illustrates a cover removal tool 132 configured to selectively secure and/or unsecure the cover 114 with respect to the structure 118 using a wireless power signal, to facilitate opening and closing the cover 114. As will be described in greater detail with respect to FIG. 4, the cover removal tool 132 includes one or more handles 134, which may be grasped by a user, and an actuation button 136 or other actuation mechanism for causing the cover removal tool 132 to provide a wireless electrical power signal to the cover 114, thereby allowing the cover 114 to be secured to or removed from the structure 118.

Figure 3A:
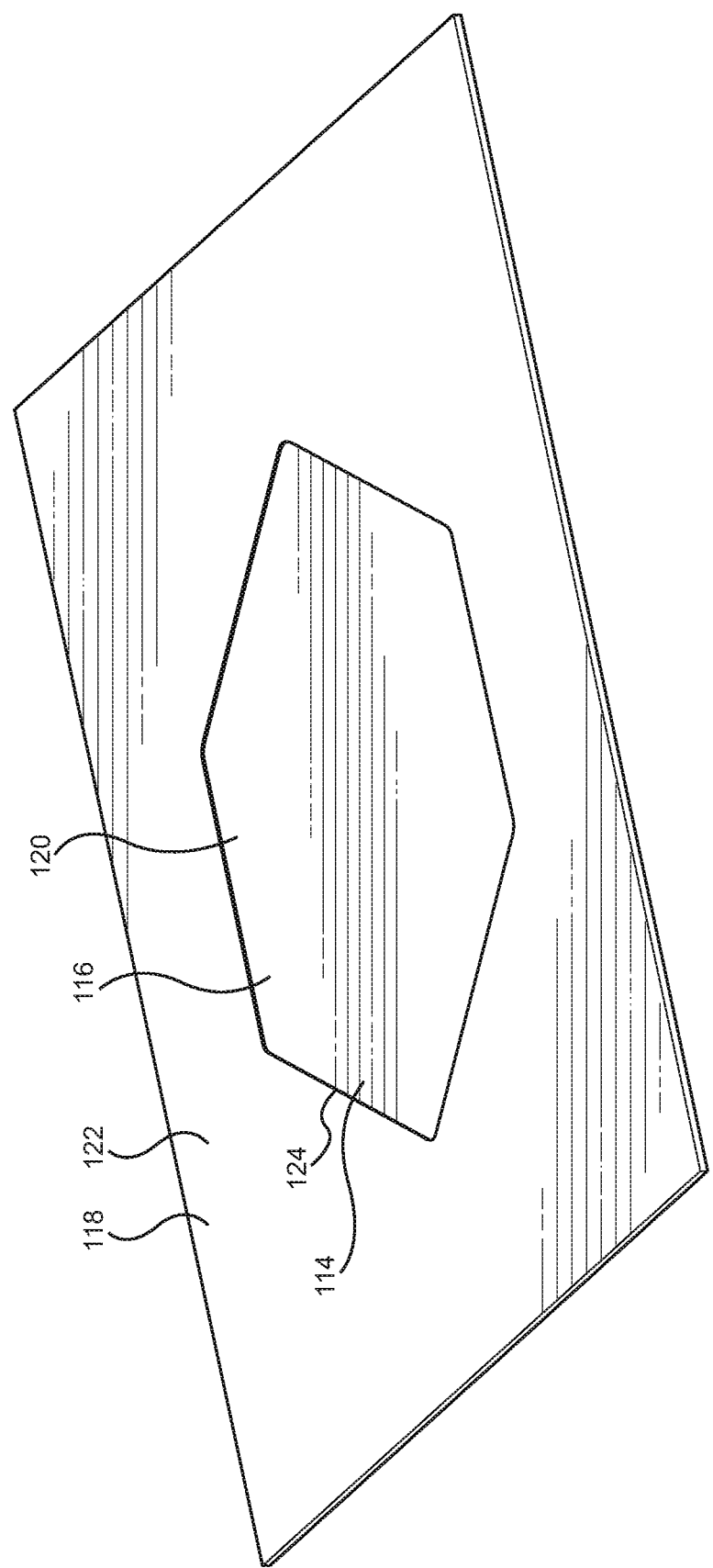
FIG. 3A illustrates an exterior surface of the cover of FIG. 2 in the secured mode, with no exposed exterior fasteners.
Figure 3B:
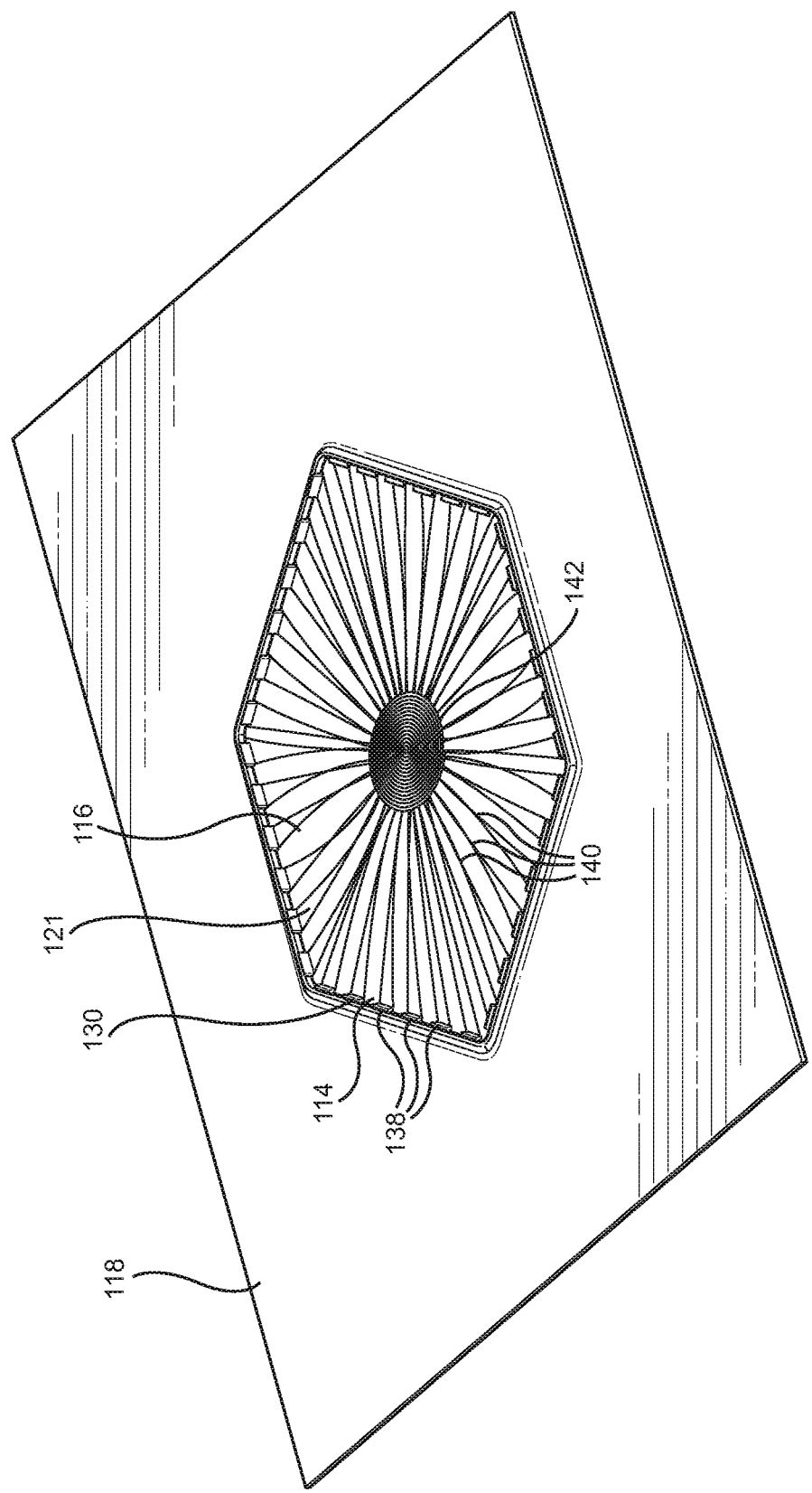
FIG. 3B illustrates an interior side of the cover of FIGS. 2 and 3A in the secured mode, showing a plurality of piezoelectric actuators configured to be wirelessly actuated to change the cover from the secured mode to the unsecured mode.

Referring now to FIGS. 3A and 3B, detailed views of the cover 114 are illustrated. As shown in FIG. 3A, the cover 114 matingly engages with the structure 118 to form a smooth continuous surface, without any exposed fasteners on the first side 120 of the cover body 116. Referring now to FIG. 3B, the second side 121 of the cover body 116 includes a plurality of fastening subassemblies 138 arranged around the cover body 116 proximate the cover body perimeter edge 124. Each of the fastening subassemblies 138 are coupled to the second side 121 and has a secured mode configured to inhibit opening the cover body 116 with respect to the structure 118, and an unsecured mode configured to facilitate opening the cover body 116 with respect to the structure 118. In this embodiment, a plurality of electrical traces 140 connect each fastening subassembly 138 to a receiver antenna 142 coupled to the cover body 116. In this embodiment, the cover body 116 may be further configured to form an airtight and/or a watertight seal between the second side 121 of the cover body 116 and an outside environment that is outside the first side 120 of the cover body 116 in response to the cover body 116 matingly engaging with the structure 118 and the fastening subassembly 138 being in the secured mode. The cover 114 may be configured to maintain the airtight and/or watertight seal up to at least a predetermined maximum pressure differential between the second side 121 of the cover body 116 and the outside environment. For example, in one embodiment, a predetermined maximum pressure differential for an airtight seal for an aircraft may be up to a 7 pound per square inch (PSI) pressure differential or more between the second side 121 of the cover body 116 and the lower pressure outside environment. In another embodiment, a predetermined maximum pressure differential for a watertight seal for a submersible vehicle may be up to a 15 PSI pressure differential or more between the second side 121 of the cover body 116 and the higher pressure outside environment.

In this embodiment, the receiver antenna 142 is disposed on the second side 121 of the cover body 116, but it should be understood that the receiver antenna 142 may alternatively be disposed within the cover body 116, so long as the receiver antenna 142 is electrically connected to the plurality of fastening subassemblies 138. The receiver antenna 142 is configured to wirelessly receive an electrical power signal from a wireless power source, such as the cover removal tool 132 of FIG. 2, for example, located in an environment on the first side 120, e.g., the exterior side, of the cover body 116. Each fastening subassembly 138 is configured to receive the wireless power signal from the receiver antenna 142 and change from a secured mode to an unsecured mode in response to receiving the wireless electrical power signal from the receiver antenna 142. In the secured mode, each fastening subassembly 138 is configured to inhibit opening the cover body 116 with respect to the structure 118. In this embodiment, the fastening subassemblies 138 are biased toward the secured mode and, in the absence of receiving the electrical power signal from the receiver antenna 142, the fastening subassemblies 138 are configured to remain in the secured mode, i.e., no power is required to maintain the fastening subassemblies 138 in the secured mode.

In response to receiving the electrical power signal from the receiver antenna 142, the fastening subassemblies 138 are changed to the unsecured mode, in which the fastening subassemblies 138 are configured to facilitate opening the cover body 116 with respect to the structure 118. In this embodiment, the fastening subassemblies 138 are further configured to disengage from the portions of the structure 118 in response to receiving the electrical power signal from the receiver antenna 142, in order to allow the cover 114 to be removed from the structure 118, e.g., by receiving the electrical power signal from the cover removal tool 132 of FIG. 2. Because the cover 114 in this embodiment does not have any other connections to the structure 118, e.g., electrical wiring, this also allows the cover 114 to be completely removed from the structure 118 without requiring physical disconnection of any other connections between the structure 118 and the cover 114.

Figure 4:
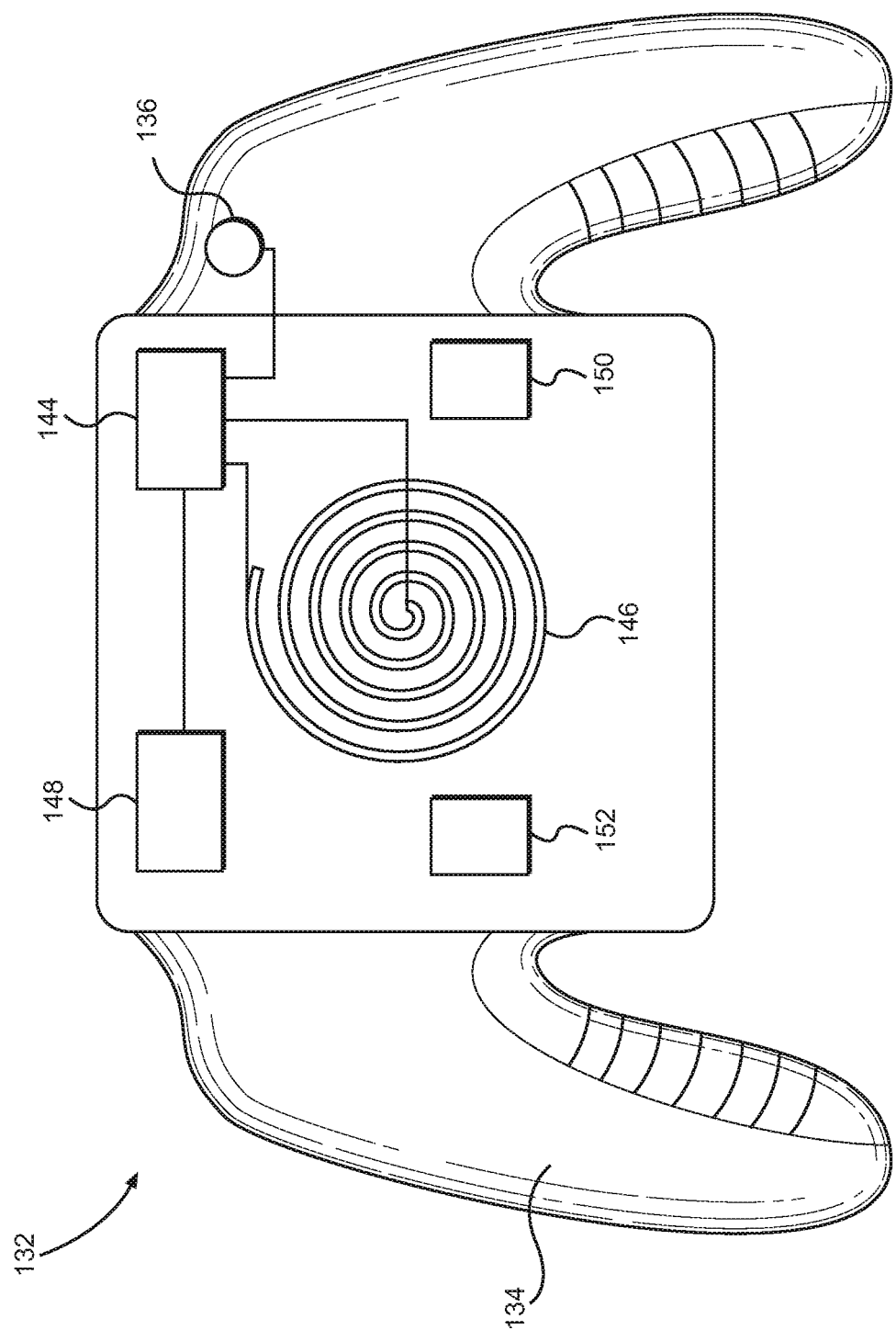
FIG. 4 illustrates a tool for wirelessly actuating the actuators of the cover of FIGS. 2-3B, according to an embodiment.

FIG. 4 illustrates a more detailed schematic view of the cover removal tool 132. The cover removal tool 132 includes a power distribution component 144 configured to provide the electrical power signal to a transmitter antenna 146. The transmitter antenna 146 is configured to be aligned with the receiver antenna 142 of the cover 114 of FIGS. 2-3B, to transmit the electrical power signal wirelessly from the transmitter antenna 146 to the receiver antenna 142 of the cover 114. The power distribution component 144 of the cover removal tool 132 may be configured to receive the electrical power signal from an onboard battery 148, or from another source as is known in the art. The cover removal tool 132 may also include one or more alignment components 150 configured to secure and align the cover removal tool 132 with the cover 114 during transmission of the electrical power signal. In this example, the alignment components 150 are magnetic elements configured to align and secure the cover removal tool 132 to the cover 114 in a manner sufficient to support the cover 114 against the force of gravity. The magnetic element may be a standalone magnet, or may be a selectively actuated electromagnetic element, for example.

Figure 5A:
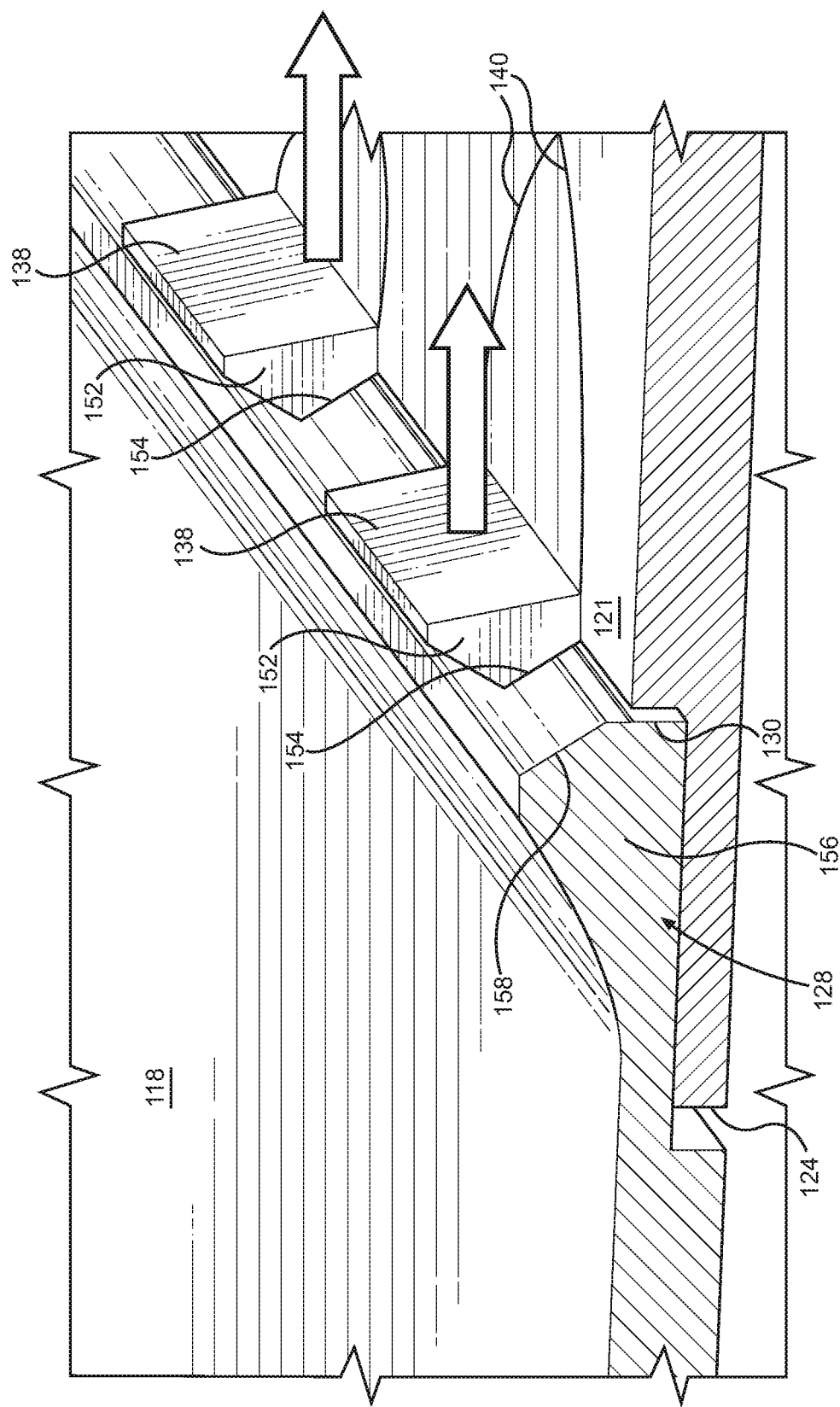
FIGS. 5A and 5B illustrate partial cutaway views of an edge of the cover of FIGS. 2-3B in the secured mode, with the piezoelectric elements engaged with an edge of the structure, and the unsecured mode, with the piezoelectric elements disengaged with the edge of the structure, respectively.
Figure 5B:
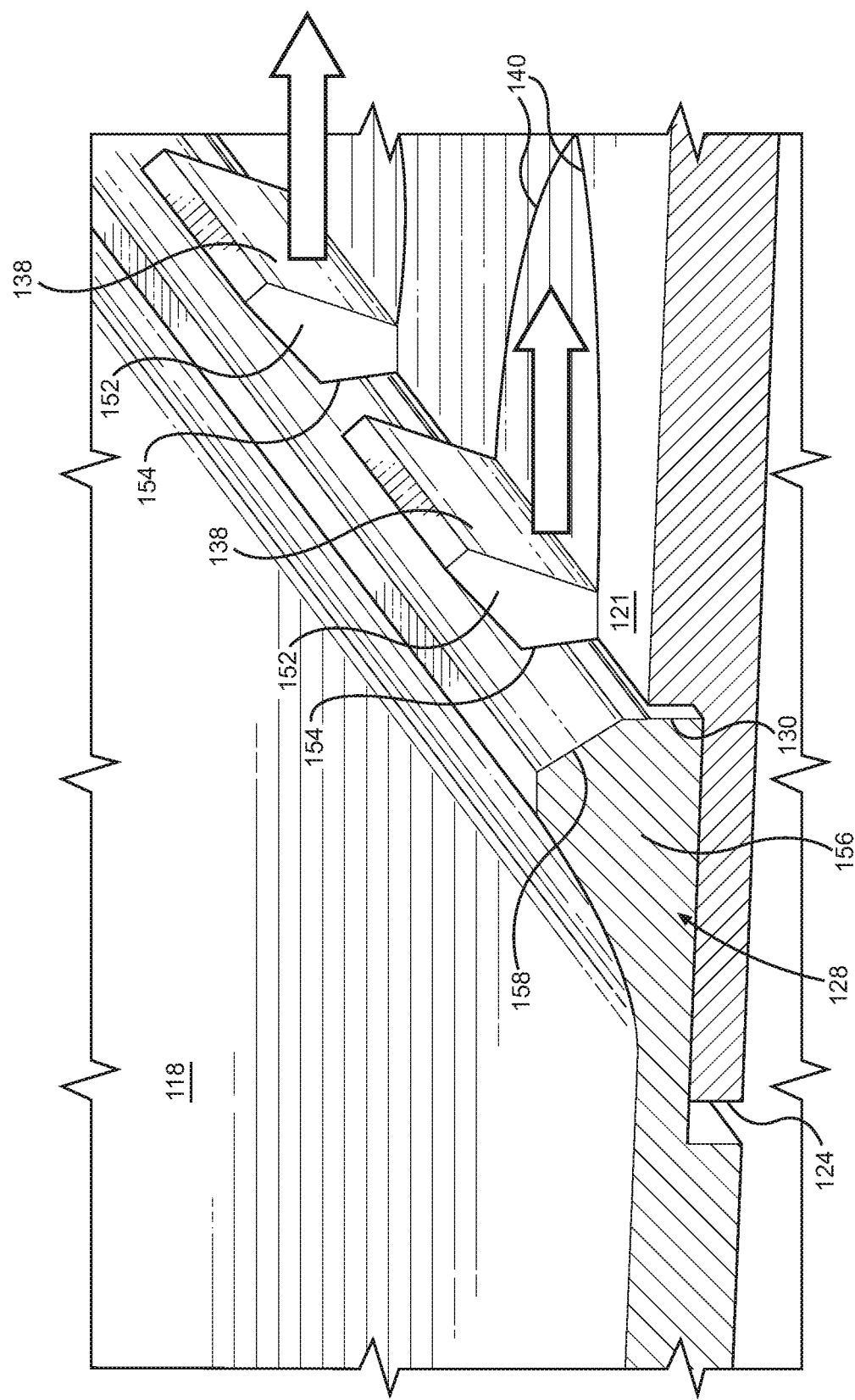

Referring now to FIGS. 5A and 5B, a more detailed view of a portion of the cover body 116 is illustrated, showing the fastening subassemblies 138 changing from the secured mode in FIG. 5A to the unsecured mode in FIG. 5B in response to receiving the electrical power signal from the receiver antenna 142. Each fastening subassembly 138 in this embodiment includes a piezoelectric (PZE) element 152 configured to displace in response to receiving an electric current, such as the electrical power signal, therethrough. In FIG. 5A, the PZE elements 152 are in the secured mode, with an angled engagement surface 154 of each PZE element 152 engaging an interior rim 156 of the structure 118. In this embodiment, the interior rim 156 of the structure 118 has a complementary angled engagement surface 158 configured to be engaged by the angled engagement surfaces 154 of the respective PZE elements 152 to inhibit removal of the cover 114 from the structure 118. This allows the cover 114 to be secured to the structure 118 without the need for any exposed fasteners on the first side 120, e.g., the exterior side, of the cover body 116.

The PZE elements 152 are configured to change from the secured mode to the unsecured mode by displacing radially inwardly in response to receiving the electrical power signal therethrough. In this regard, FIG. 5B illustrates the PZE elements 152 in the unsecured mode, in which the electrical power signal is being provided to the PZE elements 152 via the electrical traces 140. The PZE elements 152 displace inwardly with sufficient displacement to disengage the angled engagement surfaces 154 of each PZE element 152 from the complementary angled engagement surface 158 of the interior rim 156 of the structure 118. This allows the cover 114 to be easily removed from the structure 118. In response to the electrical power signal being interrupted, e.g., because of removal or deactivation of the cover removal tool 132, the PZE elements 152 are configured to return to their neutral, secured mode.

Figure 6:
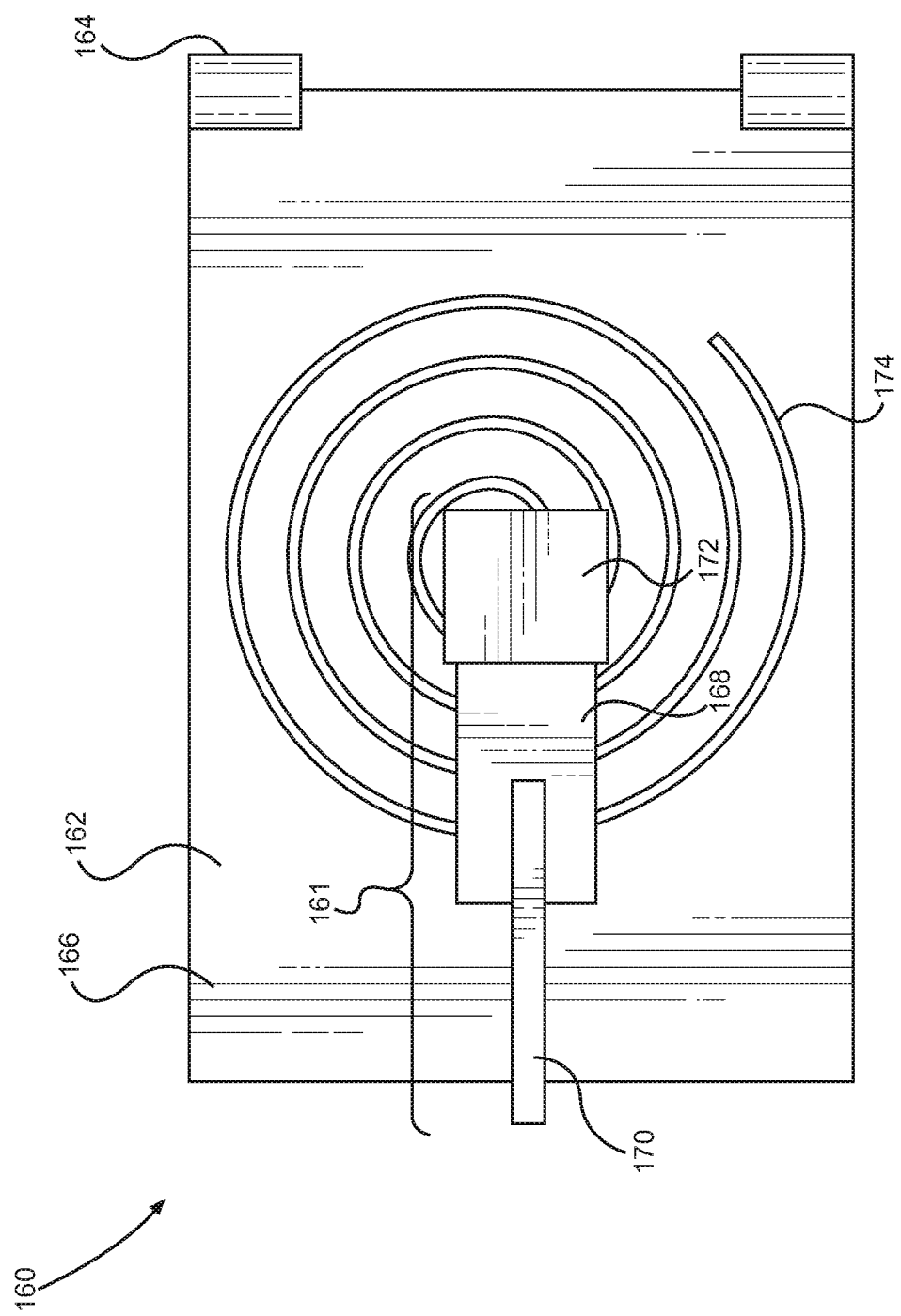
FIG. 6 illustrates a hinged cover according to another embodiment having an electromechanical actuator configured to change the cover between the secured mode and the unsecured mode.

It should be understood that many other cover configurations may be employed while retaining these advantages. In this regard, FIG. 6 illustrates a hinged cover 160 having a wirelessly actuated fastening subassembly 161 according to another embodiment. In this embodiment, the cover 160 includes a cover body 162 configured to be coupled to a structure via one or more hinges 164. The fastening subassembly 161 is mechanically coupled to an interior side 166 of the cover body 162, and includes an electromechanical actuator 168 and a fastening member 170. A power distribution component 172 is coupled between the actuator 168 and a receiver antenna 174. The receiver antenna 174 is configured to wirelessly receive an electrical power signal from a power source (not shown), such as a cover opening tool similar to the cover removal tool 132 of the embodiment of FIGS. 2-5B, for example.

Referring now to FIGS. 7A and 7B, side views of the hinged cover 160 are illustrated, showing the fastening subassembly 161 changing from the secured mode in FIG. 7A to the unsecured mode in FIG. 7B in response to receiving the electrical power signal from the receiver antenna 174. As discussed above, the fastening subassembly 161 in this embodiment includes the actuator 168 configured to actuate the fastening member 170 in response to receiving an electric current, such as the electrical power signal, from the power distribution component 172, which in turn receives the electrical power signal from the receiver antenna 174. In FIG. 7A, the fastening member 170 is in the secured mode, with the fastening member 170 engaging a structure 176. In this embodiment, the structure 176 has an exterior surface 178 and an interior surface 180, with the interior surface 180 configured to be engaged by the fastening member 170 in the secured mode. The exterior surface 178 of the structure 176 in this embodiment is configured to form a smooth continuous surface with an exterior side 182 of the cover body 162 when the cover 160 is closed. This allows the cover 160 to be secured to the structure 176 without the need for any exposed fasteners on the exterior side 182 of the cover body 162.

The fastening subassembly 161 is configured to change from the secured mode to the unsecured mode by the actuator 168, which may be an electromechanical motor, for example, retracting the fastener member 170 to facilitate opening the cover body 162 with respect to the structure 176, in response to receiving the electrical power signal from the receiving antenna. In this regard, FIG. 7B illustrates the fastening subassembly in the unsecured mode, in which the electrical power signal is being provided to the actuator 168 via the power distribution component 172. The fastening member 170 is retracted by the actuator 168 with sufficient displacement to disengage the fastening member 170 from the interior surface 180 of the structure 176. This allows the cover 160 to be easily opened with respect to the structure 176 via the hinges 164.

Figure 8A:
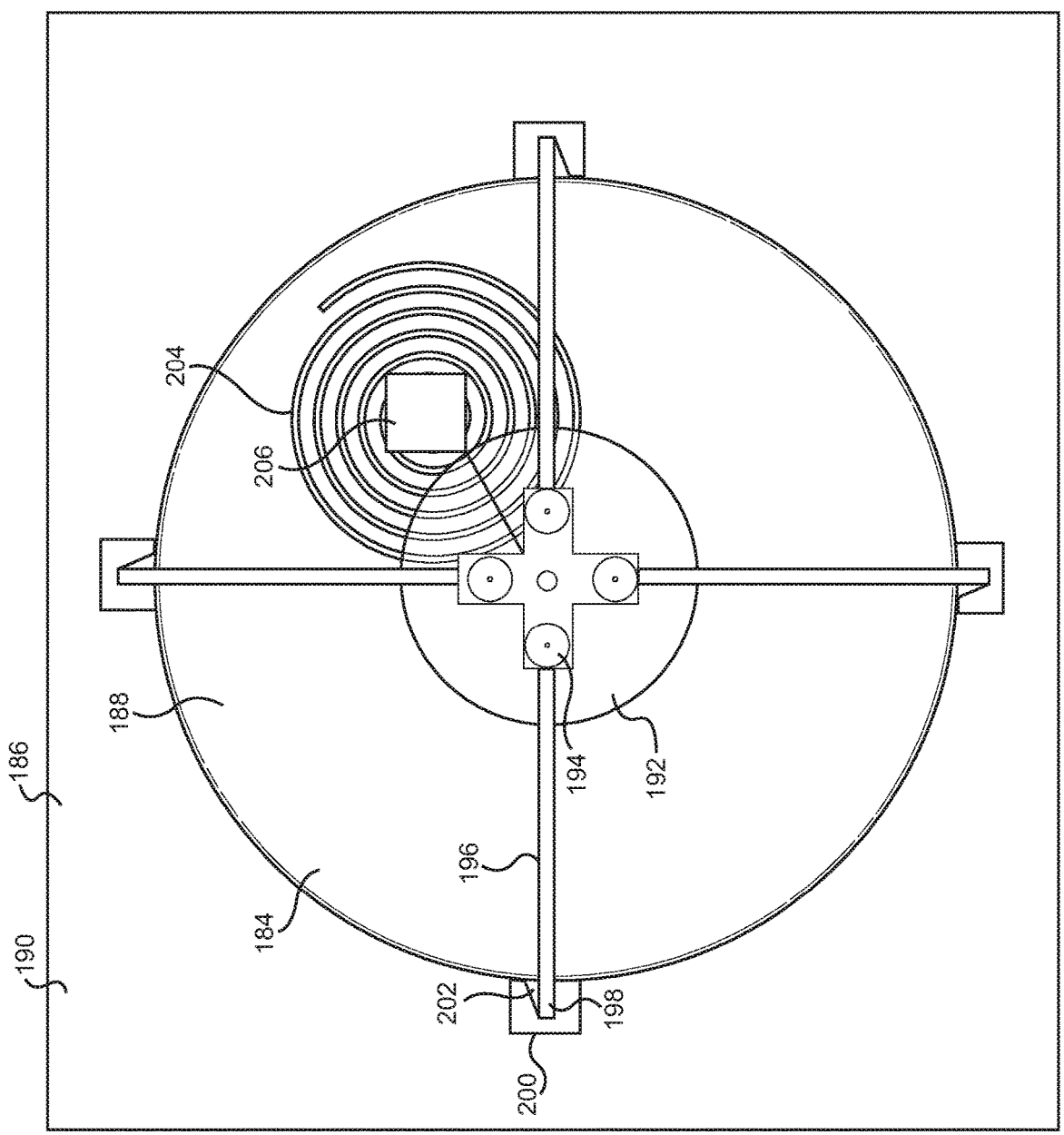
FIGS. 8A and 8B illustrate a cover having a rotatable actuator for securing the cover over the structure according to another embodiment.
Figure 8B:
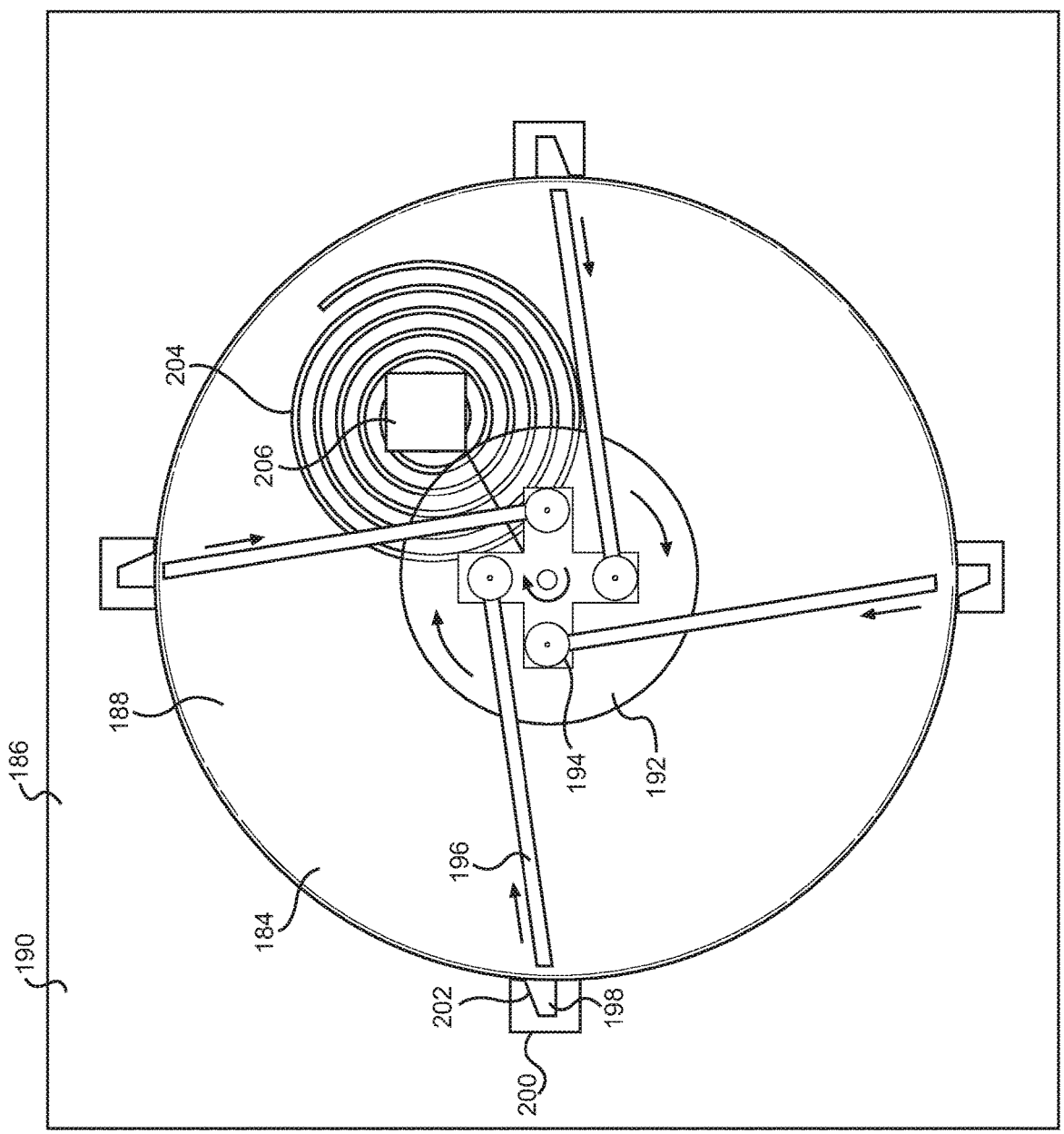

Referring now to FIGS. 8A and 8B, interior views of a cover 184 in a respective secured mode and unsecured mode are illustrated, according to another embodiment. In this embodiment, the substantially circular cover 184 is configured to matingly engage with a complementary substantially circular opening of a structure 186. An interior surface 188 of the cover 184 and an interior surface 190 of the structure 186 are configured to secure the cover 184 to the structure 186 via a rotatable actuator mechanism 192. The rotatable actuator mechanism in this embodiment includes a plurality of hinges 194 each rotatably coupled to a fastening member 196. A distal end 198 of each fastening member 196 is configured to matingly engage with a respective receiving member 200 coupled to the interior surface 190 of the structure 186 in the secured mode. As shown in FIG. 8B, rotation of the actuator mechanism 192 causes the fastening members 196 to rotate such that the distal ends 198 of the fastening members 196 are retracted out of the receiving members 200. This rotation and retraction may be facilitated by angled surfaces 202 within the receiving members 200. In this embodiment, a receiver antenna 204 is disposed on the interior surface 188 of the cover 184, configured to wirelessly receive an electrical power signal originating outside the cover 184, e.g., from a tool such as the cover removal tool 132 of FIGS. 2 and 4. The receiver antenna 204 provides the wirelessly received electrical power signal to a power distribution component, which in turn actuates the rotatable actuator mechanism 192 to retract the distal ends 198 of the fastening members 196 from the complementary receiving members 200 of the structure 186, thereby changing the rotatable actuator mechanism 192 from the secured mode configured to inhibit opening the cover 184 with respect to the structure 186, to the unsecured mode configured to facilitate opening the cover 184 with respect to the structure 186.

FIG. 9 is a flowchart diagram of a method 300 of wirelessly actuating a cover to change the cover from a secured mode to an unsecured mode, according to an embodiment. The method 300 includes wirelessly providing an electrical power signal to a receiver antenna of a cover body from a first side of the cover body (FIG. 9, block 302). The method 300 further includes receiving, by a fastening subassembly on a second side of the cover body opposite the first side, the electrical power signal from the receiver antenna (FIG. 9, block 304). The method 300 further includes changing, by the fastening subassembly in response to receiving the electrical power signal from the receiver antenna, from a secured mode configured to inhibit opening the cover body with respect to the structure, to an unsecured mode configured to facilitate opening the cover body with respect to the structure (FIG. 9, block 306).

Those skilled in the art will recognize improvements and modifications to the preferred embodiments of the disclosure. All such improvements and modifications are considered within the scope of the concepts disclosed herein and the claims that follow.

What is claimed is:

1. A cover comprising:
   a cover body having a first side and a second side opposite the first side, the cover body configured to matingly engage with a structure to separate a first environment on the first side of the cover body from a second environment on the second side of the cover body;
   a receiver antenna coupled to the cover body, the receiver antenna configured to wirelessly receive an electrical power signal from a wireless power source located in the first environment; and
   a fastening subassembly coupled to the second side of the cover body, the fastening subassembly having a secured mode configured to inhibit opening the cover body with respect to the structure, and an unsecured mode configured to facilitate opening the cover body with respect to the structure, the fastening subassembly configured to:

receive the electrical power signal from the receiver antenna; and change from the secured mode to the unsecured mode in response to receiving and being powered by only the electrical power signal from the receiver antenna;

wherein the cover body is further configured to form a seal up to at least a predetermined pressure differential between the first environment and the second environment in response to the cover body matingly engaging with the structure and the fastening subassembly being in the secured mode.

2. The cover of claim 1, wherein the fastening subassembly is further configured to change from the unsecured mode to the secured mode in response to an interruption in receiving the electrical power signal from the receiver antenna.

3. The cover of claim 1, wherein the fastening subassembly comprises:
   a fastening member configured to:
      engage with a fastening portion of the structure in the secured mode of the fastening subassembly; and
      disengage from the fastening portion of the structure in the unsecured mode; and
   an actuator coupled between the receiver antenna and the fastening member, the actuator configured to:
      receive the electrical power signal from the receiver antenna; and
      actuate the fastening member in response to receiving the electrical power signal to disengage the fastening member from the fastening portion of the structure.

4. The cover of claim 3, wherein the actuator comprises an electromechanical actuator.

5. The cover of claim 1, wherein the fastening subassembly comprises a piezoelectric element coupled to the receiver antenna, the piezoelectric element configured to:
   receive the electrical power signal from the receiver antenna; and
   disengage from a fastening portion of the structure in response to receiving the electrical power signal from the receiver antenna.

6. The cover of claim 5, wherein the piezoelectric element is further configured to engage with the fastening portion of the structure in response to an interruption in receiving the electrical power signal from the receiver antenna.

7. The cover of claim 1, wherein the first side of the cover body is devoid of fasteners.

8. The cover of claim 7, wherein the first side of the cover body has an exterior perimeter edge configured to matingly engage an interior perimeter edge of the structure in the secured mode to form a smooth continuous surface with a surface of the structure.

9. The cover of claim 1, wherein the structure is a housing forming an interior volume, wherein the cover body is configured to separate the interior volume of the housing from the first environment in response to the cover body matingly engaging with the housing.

10. The cover of claim 1, wherein the cover body is further configured to form an airtight seal between the first environment and the second environment in response to the cover body matingly engaging with the structure and the fastening subassembly being in the secured mode.

11. The cover of claim 10, wherein the cover body is configured to maintain the airtight seal up to at least 7 pounds per square inch (PSI) between the second side of the cover body and the first environment.

12. The cover of claim 1, wherein the cover body is further configured to form a watertight seal between the first environment and the second environment in response to the cover body matingly engaging with the structure and the fastening subassembly being in the secured mode.

13. The cover of claim 12, wherein the cover body is configured to maintain the watertight seal up to at least 15 pounds per square inch (PSI) between the second side of the cover body and the first environment.

14. A method of selectively covering a portion of a structure, the method comprising:
   wirelessly receiving, by a receiver antenna coupled to a cover body from a first side of the cover body, an electrical power signal from a wireless power source located in a first environment;
   receiving, by a fastening subassembly coupled to a second side of the cover body opposite the first side, the electrical power signal from the receiver antenna;
   changing, by the fastening subassembly in response to receiving and being powered by only the electrical power signal from the receiver antenna, from a secured mode configured to inhibit opening the cover body with respect to the structure, to an unsecured mode configured to facilitate opening the cover body with respect to the structure;
   matingly engaging the cover body with a structure to separate the first environment on the first side of the cover body from a second environment on the second side of the cover body; and
   forming, in response to the cover body matingly engaging with the structure and the fastening subassembly being in the secured mode, a seal up to at least a predetermined pressure differential between the first environment and the second environment.

15. The method of claim 14, further comprising:
   changing, by the fastening subassembly in response to interrupting the wirelessly receiving the electrical power signal by the receiver antenna, from the unsecured mode to the secured mode.

* * * * *